United States Patent [19]
Fujioka et al.

[11] Patent Number: 5,985,371
[45] Date of Patent: Nov. 16, 1999

[54] PRIMER COMPOSITIONS

[75] Inventors: Kazutoshi Fujioka; Takashi Kondou, both of Usui-gun, Japan

[73] Assignee: Shin-Etsu Chemical Co., Ltd., Tokyo, Japan

[21] Appl. No.: 08/985,084

[22] Filed: Dec. 4, 1997

[30] Foreign Application Priority Data

Dec. 5, 1996 [JP] Japan .................................. 8-340596
Dec. 5, 1996 [JP] Japan .................................. 8-340597

[51] Int. Cl.$^6$ ....................................................... B05D 3/02
[52] U.S. Cl. ............................... 427/387; 528/15; 528/17; 528/24; 528/31; 524/265; 524/267; 524/268
[58] Field of Search ............................... 427/387; 528/15, 528/17, 24, 31; 524/265, 268, 267

[56] References Cited

U.S. PATENT DOCUMENTS 4,332,844  6/1982  Hamada et al. ..................... 427/387
5,470,923  11/1995  Krahnke et al. ..................... 525/477

FOREIGN PATENT DOCUMENTS 61-4860   2/1986  Japan .
63-48904  10/1988 Japan .

*Primary Examiner*—Melvyn I. Marquis
*Assistant Examiner*—Mark W. Milstead
*Attorney, Agent, or Firm*—Millen, White, Zelano & Branigan, P.C.

[57] ABSTRACT

The invention provides a primer composition comprising (I) an organoalkoxysilane or siloxane, (II) an organohydrogensiloxane having an SiH group and an alkoxysilyl group, and (III) an organic titanate. Also provided is a primer composition comprising (A) an alkenyl-containing organopolysiloxane, (B) an organopolysiloxane, (C) an organoalkoxysilane or siloxane, (D) an organohydrogensiloxane having an SiH group and an alkoxysilyl group, (E) a platinum catalyst, (F) an organic titanate, and (G) an organic peroxide. The primer compositions have sufficient adhesion to join thermoset silicone rubber to various substrates.

20 Claims, 1 Drawing Sheet

PRIMER COMPOSITIONS

This invention relates to a primer composition having sufficient adhesion to join thermoset silicone rubber to various substrates.

BACKGROUND OF THE INVENTION

When it is desired to join silicone rubber to various substrates, one common practice is to previously apply primer compositions. A number of primer compositions are known. For example, JP-B 2107/1986 corresponding to U.S. Pat. No. 4,332,844 discloses a primer composition comprising an organic silicon compound having an alkoxy group, an organic titanium compound, and an organic silicon compound having an SiH group. JP-A 25615/1994 corresponding to U.S. Pat. No. 5,326,844 discloses a primer composition comprising an organic silicon compound having a group represented by the formula: $-CR^2R^3(CH_2)_nCOOR^1$. JP-B 4866/1986 discloses a primer composition comprising an organopolysiloxane raw rubber, organopolysiloxane resin, organoalkoxysilane or siloxane, organic titanate, and organohydrogensiloxane. Further, JP-B 48904/1988 discloses a primer composition comprising an organopolysiloxane raw rubber, organopolysiloxane resin, organoalkoxysilane or siloxane, organohydrogensiloxane, platinum series catalyst, organic titanate, and organic peroxide.

As dry plain paper copiers (PPC) and laser beam printers (LBP) are reduced in weight and size, there is an increasing demand for thermoset silicone rubber having a low hardness as typified by a JIS A scale hardness of 20 or lower. With conventional primer compositions as mentioned above, most thermoset silicone rubbers having a low hardness cannot be bonded to various substrates. There is a desire to have a primer composition which can bond such low hardness thermoset silicone rubber to substrates.

SUMMARY OF THE INVENTION

Therefore, an object of the invention is to provide a novel and improved primer composition having sufficient adhesion to join thermoset silicone rubber, especially low hardness thermoset silicone rubber to various substrates.

In a first aspect, the present invention provides a primer composition comprising (I) 100 parts by weight of an organoalkoxysilane or siloxane of the following average compositional formula (1):

$$R^1_a R^2_b (OR^3)_c SiO_{(4-a-b-c)/2} \quad (1)$$

wherein $R^1$ is a substituted or unsubstituted monovalent aa.aa. hydrocarbon group, $R^2$ is a monovalent organic group having a functional group, $R^3$ is an unsubstituted or alkoxy-substituted alkyl group, letters a, b and c are numbers satisfying $0 \le a \le 3$, $0 \le b \le 3$, $0 < C < 4$, and $0 < a+b+c \le 4$, (II) 1 to 500 parts by weight of an alkoxysilyl-containing organohydrogensiloxane of the following average compositional formula (2):

$$H_d R^4_e (XSiR^5_g (OR^6)_h)_f SiO_{(4-d-e-f)/2} \quad (2)$$

wherein $R^4$ and $R^5$ each are a substituted or unsubstituted monovalent hydrocarbon group, $R^6$ is an unsubstituted or alkoxy-substituted alkyl group, X is a substituted or unsubstituted divalent organic group or oxygen atom, letters d, e and f are numbers satisfying $0 < d \le 2$, $0 \le e \le 3$, $0 < f \le 3$, and $0 < d+e+f \le 4$, letter q is equal to 0, 1 or 2, letter h is equal to 1, 2 or 3, and g+h=3, and (III) 0.1 to 500 parts by weight of an organic titanate.

The alkoxysilyl-containing organohydrogensiloxane (II) is preferably of the following general formula (3) or (4):

(3)

(4)

wherein $R^7_1$, $R^8_1$, $R^9_1$, $R^{10}$, and $R^{11}$ each are a substituted or unsubstituted monovalent hydrocarbon group, Y is a substituted or unsubstituted divalent organic group, $R^{12}$ is an unsubstituted or alkoxy-substituted alkyl group, letters k, mm, m', and r are integers satisfying $0 < k \le 20$, $0 \le m \le 20$, $1 \le m' \le 20$, and $1 \le r \le 20$, letter p is equal to 0, 1 or 2, letter q is equal to 1, 2 or 3, and p+q=3.

In a second aspect, the present invention provides a primer composition comprising (A) 100 parts by weight of an alkenyl-containing organopolysiloxane of the following average compositional formula (5) having a viscosity of at least 5,000 centistokes at 25° C.:

(5)

wherein $R^{13}$ is a substituted or unsubstituted monovalent hydrocarbon group, at least 0.15 mol % of $R^{13}$ is alkenyl,aa, letter i is a positive number satisfying $1.9 \le i \le 2.3$, (B) 5 to 200 parts by weight of an organopolysiloxane of the following average compositional formula (6):

(6)

wherein $R^{14}$ is a substituted or unsubstituted monovalent hydrocarbon group and letter j is a positive number satisfying $0.5 \le j \le 1.8$, (C) 5 to 500 parts by weight of an organoalkoxysilane or siloxane of the following average compositional formula (1):

(1)

wherein $R^1$ is a substituted or unsubstituted monovalent hydrocarbon group, $R^2$ is a monovalent organic group having a functional group, $R^3$ is an unsubstituted or alkoxy-substituted alkyl group, letters a, b and c are numbers satisfying $0 \le a \le 3$, $0 \le b \le 3$, $0 < c \le 4$, and $0 < a+b+c \le 4$, (D) 1 to 500 parts by weight of an organohydrogensiloxane of the following general formula (3) having an SiH group at a molecular chain end and an alkoxysilyl group in a molecule:

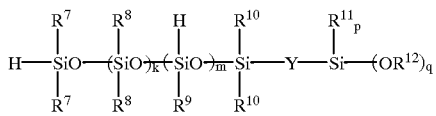

(3)

wherein $R^7$, $R^8$, $R^9$, $R^{10}$, and $R^{11}$ each are a substituted or unsubstituted monovalent hydrocarbon group, Y is a substituted or unsubstituted divalent organic group, $R^{12}$ is an unsubstituted or alkoxy-substituted alkyl group, letters k and m are integers satisfying $0<k\leq 20$ and $0\leq m\leq 20$, letter p is equal to 0, 1 or 2, letter q is equal to 1, 2 or 3, and p+q=3, (E) 1 to 100 ppm calculated as platinum metal of a platinum series catalyst, (F) 0.1 to 100 parts by weight of an organic titanate, and (G) 0.1 to 5 parts by weight of an organic peroxide.

The primer compositions of the invention have a sufficient bonding power to join thermoset silicone rubber to various substrates, and even low hardness thermoset silicone rubber to various substrates.

We presumed that no sufficient interaction occurs between a low hardness thermoset silicone rubber and a conventional primer composition due to the low crosslinking density of the silicone rubber, which causes the primer to separate from the low hardness thermoset silicone rubber. Then we sought for a compound capable of enhancing the interaction between a primer composition and thermoset silicone rubber. We have found that it is important in solving the above problem to implant an addition reactive SiH group in the matrix of a primer. We have found that an organohydrogensiloxane having an SiH group and an alkoxysilyl group represented by formula (2) is effective for improving the adhesion of a primer composition because the SiH group in its molecule is effectively taken in the matrix of the primer and appropriate stress mitigating action is exerted. Therefore, a primer coating obtained by blending the alkoxysilyl-containing organohydrogensiloxane of formula (2) with an organoalkoxysilane or siloxane of formula (1) and an organic titanate is effective for drastically improving the adhesion with a low hardness thermoset silicone rubber and provides appropriate stress mitigating action. This primer coating is well adhesive to a low hardness thermoset silicone rubber having a JIS A scale hardness of 20 or lower.

We have also found that an organohydrogensiloxane having an SiH group at an end of its molecular chain and an alkoxysilyl group in its molecule represented by formula (3) is highly effective for improving the adhesion of the primer composition because the SiH group is effectively taken in the matrix of the primer so that the interaction between the thermoset silicone rubber and the primer composition is enhanced and stress mitigating action is exerted. moreover, a primer coating obtained-by blending the organohydrogensiloxane having an SiH group at an end of its molecular chain and an alkoxysilyl group in its molecule represented by formula (3) with an alkenyl-containing organopolysiloxane raw rubber of formula (5), an organopolysiloxane resin of formula (6), an organoalkoxysilane or siloxane of formula (1), and an organic titanate, and curing the resulting composition with a platinum series catalyst and an organic peroxide is effective for drastically improving the adhesion with a low hardness thermoset silicone rubber and provides appropriate stress mitigating action. This primer coating is well adhesive to a low hardness thermoset silicone rubber having a JIS A scale hardness of 20 or lower. The present invention is predicated on these findings.

It is noted that the JIS A scale hardness is a hardness measurement by an A scale hardness meter as prescribed in JIS C2123-9.

BRIEF DESCRIPTION OF THE DRAWINGS

The only FIGURE.

DETAILED DESCRIPTION OF THE INVENTION

First Primer Composition

Figure 1:
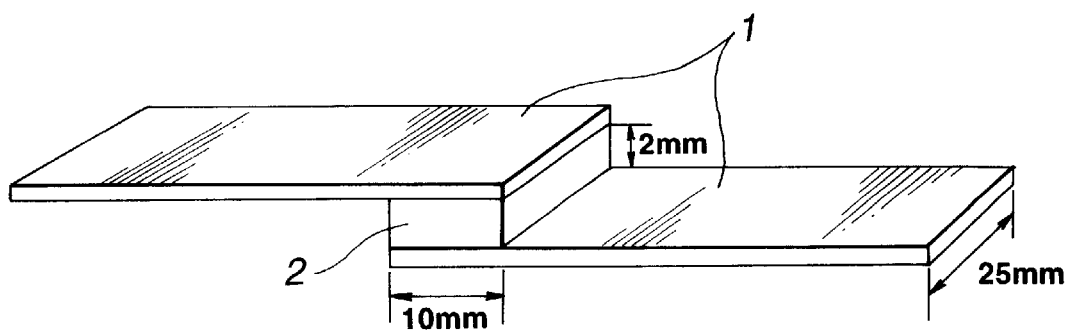
FIG. 1 is a perspective view of an adhesion test sample used in Examples.

In the first aspect of the invention, the primer composition contains (I) 100 parts by weight of an organoalkoxysilane or siloxane of the average compositional formula (1), (II) 1 to 500 parts by weight of an alkoxysilyl-containing organohydrogensiloxane of the average compositional formula (2), and (III) 0.1 to 500 parts by weight of an organic titanate.

The organoalkoxysilane or siloxane contained in the first primer composition as component (I) is of the following average compositional formula (1):

(1)

wherein $R^1$ is a substituted or unsubstituted monovalent hydrocarbon group, $R^2$ is a monovalent organic group having a functional group, R2 is an unsubstituted or alkoxy-substituted alkyl group, letters a, b and c are numbers satisfying $0\leq a\leq 3$, $0\leq b\leq 3$, $0<c\leq 4$, and $0<a+b+c\leq 4$.

In formula (1), $R^1$ is a substituted or unsubstituted monovalent hydrocarbon group, preferably those having 1 to 10 carbon atoms, especially 1 to 6 carbon atoms and free of an aliphatic unsaturated bond, for example, alkyl groups such as methyl, ethyl, propyl, butyl, pentyl, hexyl, and cyclohexyl; aryl groups such as phenyl, tolyl, and naphthyl; aralkyl groups such as benzyl and phenylethyl; and substituted ones of these group wherein a hydrogen atom(s) is replaced by a halogen atom or cyano group, such as chloromethyl, bromoethyl, trifluoropropyl, and cyanoethyl.

$R^2$ is a monovalent organic group having a functional group. Examples of the functional group include alkenyl groups such as vinyl, allyl, propenyl and butenyl; and functional groups capable of addition reaction, condensation reaction or radical reaction such as acryl, methacryl, epoxy, amino, aminoalkyl-substituted amino, mercapto, and α-alkoxycarbonyl. The monovalent organic groups having such a functional group are exemplified by groups: R'—(Z)$_x$— wherein R' is the above-mentioned functional group, Z is an alkylene group of 1 to 10 carbon atoms, especially 1 to 3 carbon atoms which may be separated by an ether linkable oxygen atom, and letter x is 0 or 1.

$R^3$ is an unsubstituted or alkoxy-substituted alkyl group, preferably having 1 to 4 carbon atoms, for example, methyl, ethyl, propyl, butyl, methoxymethyl, methoxyethyl, ethoxymethyl, and ethoxyethyl. Letters a, b and c are numbers satisfying $0\leq a\leq 3$, $0b\leq 3$, $0<c\leq 4$, and $0<a+b+c\leq 4$, preferably $0\leq a\leq 1$, $0\leq b\leq 1$, $2\leq c\leq 4$, and $2\leq a+b+c\leq 4$.

Illustrative, non-limiting examples of the organoalkoxysilane include vinyltrimethoxysilane, vinyltriethoxysilane, vinyltris(β-methoxyethoxy)silane, methylvinyldiethoxysilane, allyltrimethoxysilane, γ-acryloyloxymethyltrimethoxysilane, γ-methacryloyloxypropyltrimethoxysilane, γ-glycidyloxypropyltrimethoxysilane, γ-aminopropyltrimethoxy-silane, γ-aminopropyltriethoxysilane, N-(β-aminoethyl)-γ-aminopropyltrimethoxysilane, γ-mercaptopropyltrimethoxy-silane, α-(ethoxycarbonyl) ethyltrimethoxysilane, tetra-methoxysilane, and tetraethoxysilane. Also useful are alkoxysiloxanes having at least one, preferably at least two alkoxy groups left in a molecule resulting from partial hydrolysis of the foregoing organoalkoxysilanes. These organoalkoxysilanes and siloxanes may be used in admixture of two or more.

The organohydrogensiloxane as component (II) is an essential component for drastically improving the adhesion of the primer composition of the invention. It is an organohydrogensiloxane of the following average compositional formula (2), that is, an organohydrogensiloxane having a monovalent group of formula (2a) and a hydrogen atom attached to a silicon atom (i.e., SiH group) in a molecule.

$$H_dR^4_e(XSiR^5_g(OR^6)_h)_fSiO_{(4-d-e-f)/2} \tag{2}$$

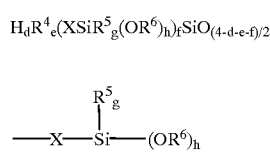

(2a)

In the formulae, $R^4$ and $R^5$ each are a substituted or unsubstituted monovalent hydrocarbon group, $R^6$ is an unsubstituted or alkoxy-substituted alkyl group, X is a substituted or unsubstituted divalent organic group or oxygen atom, letters d, e and f are numbers satisfying $0<d\leq2$, $0\leq e\leq3$, $0<f\leq3$, and $0<d+e+f\leq4$, letter g is equal to 0, 1 or 2, letter h is equal to 1, 2 or 3, and g+h =3.

In formula (2), each of $R^4$ and $R^5$ is preferably a substituted or unsubstituted monovalent hydrocarbon group free of an aliphatic unsaturated bond, examples of which are the same as described for $R^1$. $R^6$ is an unsubstituted or alkoxy-substituted alkyl group as defined for $R^3$. X is a substituted or unsubstituted divalent organic group or oxygen atom. The substituted or unsubstituted divalent organic groups are preferably those having 1 to 10 carbon atoms, especially 1 to 3 carbon atoms, for example, alkylene groups such as methylene, ethylene, propylene, and butylene, arylene groups such as phenylene, and substituted ones of these groups wherein a hydrogen atom(s) is replaced by a halogen atom or cyano group.

The monovalent substituent of formula (2a): —X—SiR$^5_g$(OR$^6$)$_h$ is attached to a silicon atom which forms a siloxane structure (≡—Si—O—Si≡). Preferred substituents of formula (2a) are alkoxysilylalkyl groups. Exemplary alkoxysilylalkyl groups are trialkoxysilylalkyl and alkyldialkoxysilylalkyl groups as shown below though not limited thereto.

trialkoxysilylalkyl groups:

—(CH$_2$)$_2$—Si(OCH$_3$)$_3$, —(CH$_2$)$_2$—Si(OC$_2$H$_5$)$_3$,
—(CH$_2$)$_2$—Si(OC$_3$H$_7$)$_3$, —(CH$_2$)$_3$—Si(OCH$_3$)$_3$,
—(CH$_2$)$_3$—Si(OC$_2$Haas)$_3$, —(CH$_2$)$_3$—Si(OC$_3$H$_7$)$_3$ alkyldialkoxysilylalkyl groups:

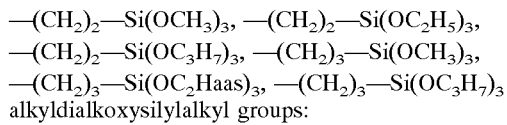

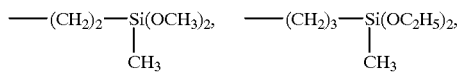

Letters d, e and f are numbers satisfying $0<d\leq2$, $0\leq e\leq3$, $0<f\leq3$, and $0<d+e+f\leq4$, preferably $0<d\leq1$, $1\leq e\leq2$, $0<f\leq1$, and $2\leq d+e+f\leq3$. Letter g is equal to 0, 1 or 2, letter h is equal to 1, 2 or 3, preferably g is equal to 0 or 1 and h is equal to 2 or 3, and g+h=3.

The organohydrogensiloxane having a monovalent substituent of formula (2a) is not limited in structure and may take any of linear, cyclic, branched and three-dimensional network structures.

Preferred among the alkoxysilyl-containing organohydrogensiloxanes of formula (2) are those of the following general formula (3) or (4):

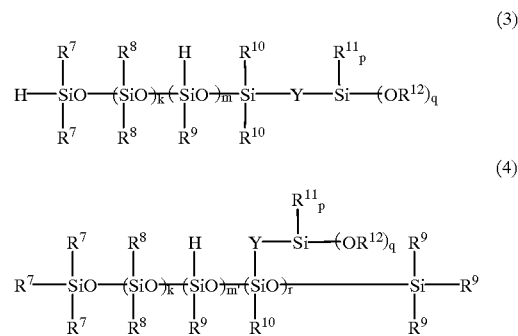

wherein $R^7$, $R^8$, $R^9$, $R^{10}$, and $R^{11}$ each are a substituted or unsubstituted monovalent hydrocarbon group, Y is a substituted or unsubstituted divalent organic group, $R^{12}$ is an unsubstituted or alkoxy-substituted alkyl group, letters k, m, m', and r are integers satisfying $0<k\leq20$, $0\leq m\leq20$, $1\leq m'\leq20$, and $1\leq r\leq20$, letter p is equal to 0, 1 or 2, letter q is equal to 1, 2 or 3, and p+q=3.

In formula (3), each of $R^7$, $R^8$, $R^9$, $R^{10}$, and $R^{11}$ is a substituted or unsubstituted monovalent hydrocarbon group, preferably such a hydrocarbon group free of an aliphatic unsaturated bond, examples of which are the same as described for $R^1$. $R^{12}$ is an unsubstituted or alkoxy-substituted alkyl group as defined for $R^3$. Y is a substituted or unsubstituted divalent organic group, - preferably those having 1 to 10 carbon atoms, especially 1 to 4 carbon atoms, for example, alkylene groups such as methylene, ethylene, propylene, and butylene, arylene groups such as phenylene, and substituted ones of these groups wherein a hydrogen atom(s) is replaced by a halogen atom or cyano group. Letters k, m, m', and r are integers satisfying $0<k\leq20$, $0\leq m\leq20$, $1\leq m'\leq20$, and $1\leq r\leq20$, preferably $5\leq k\leq15$, $2\leq m\leq10$, $2\leq m'\leq10$, and $1\leq r\leq10$. Letter p is equal to 0, 1 or 2, letter q is equal to 1, 2 or 3, preferably p is equal to 0 or 1, q is equal to 2 or 3, and p+q=3.

Preferred examples of the monovalent substituent: —Y—SiR$^{11}_p$(OR$^{12}$)$_q$ are alkoxysilylalkyl groups such as trialkoxysilylalkyl and alkyldialkoxysilylalkyl groups as shown below.

trialkoxysilylalkyl groups:

—(CH$_2$)$_2$—Si(OCH3$_3$)$_3$, —(CH$_2$)$_2$—Si(OC$_2$H$_5$)$_3$,
—(CH$_2$)$_2$—Si(OC$_3$H$_7$)$_3$, —(CH$_2$)$_3$—Si(OCH$_3$)$_3$,
—(CH$_2$)$_3$—Si(OC$_2$H$_5$)$_3$, —(CH$_2$)$_3$—Si(OC$_3$H$_7$)$_3$ alkyldialkoxysilylalkyl groups:

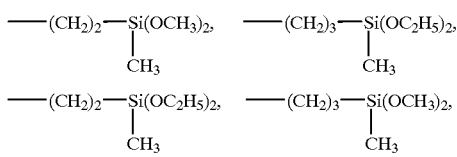

The organohydrogensiloxane having an alkoxysilyl group is obtainable by subjecting a corresponding organohydrogensiloxane and an organoalkoxysilane having an alkenyl group such as vinyl and allyl to addition reaction in the presence of a platinum series catalyst, or by subjecting a corresponding organohydrogensiloxane and an organoalkoxysilane to equilibration in the presence of an acid catalyst.

In the practice of the invention, the organohydrogensiloxanes may be used alone or in admixture of two or more. The amount of the organohydrogensiloxane blended is 1 to 500 parts, preferably 2 to 200 parts by weight per 100 parts by weight of component (I). A composition containing less than 1 part of the organohydrogensiloxane on this basis would form a weak coating, failing to achieve sufficient bond strength. A composition containing more than 500 parts of the organohydrogensiloxane would form a brittle coating, also failing to achieve sufficient bond strength.

The organic titanate ester used as component (III) of the primer composition of the invention is essential for enabling the condensation curing of the primer composition, ensuring air drying and improving the adhesion between the coating and a substrate. Examples of the organic titanate include tetramethyl titanate, tetraethyl titanate, tetrapropyl titanate, tetrabutyl titanate, tetraoctyl titanate, titanium tetrakis(bis-2,2-(allyloxymethyl)-butoxide), tetrakis(trimethylsiloxy) titanium, (triisopropyl-titanoxy)tri-n-butyltin, (2-methacryloxyethyl)triisopropyl titanate, titanium diisopropoxide (bis-2,4-pentanedionate), titanium di-n-butoxide bis(ethyl acetoacetate), titanium lactate, titanium methacrylate triisopropoxide, titanium allyl acetoacetate triisopropoxide, titanium methacryloxyethyl acetoacetate triisopropoxide, and titanocene diphenoxide.

The amount of the organic titanate is 0.1 to 500 parts, preferably 0.3 to 100 parts by weight per 100 parts by weight of component (I). Less than 0.1 part of the organic titanate on this basis would little promote air drying and form a weak coating, failing to achieve sufficient bond strength. A composition containing more than 500 parts of the organic titanate would form a brittle coating, also failing to achieve sufficient bond strength.

The first primer composition can be obtained by uniformly mixing predetermined amounts of components (I) to (III). If desired, a suitable solvent is added to the composition for dilution. Such solvents are selected from hexane, heptane, toluene, xylene, acetone, methyl ethyl ketone, ethyl acetate, ethanol, isopropanol, methylene chloride, and trichloroethylene and mixtures thereof. Other optional additives are added to the primer composition of the invention. For example, various pigments are added such that it is known that the composition has been coated. Exemplary are inorganic pigments such as carbon, red iron oxide and titanium oxide and organic pigments. Inorganic fillers such as fumed silica, red iron oxide, cerium oxide, and titanium oxide are also useful for improving the strength and heat resistance of the resulting coating. These optional additives are added in suitable amounts insofar as the objects of the invention are not impaired.

Second Primer Composition

In the second aspect of the invention, the primer composition contains (A) 100 parts by weight of an alkenyl-containing organopolysiloxane of the average compositional formula (5) having a viscosity of at least 5,000 centistokes at 25° C., (B) 5 to 200 parts by weight of an organopolysiloxane of the average compositional formula (6), (C) 5 to 500 parts by weight of an organoalkoxysilane or siloxane of the average compositional formula (1), (D) 1 to 500 parts by weight of an organohydrogensiloxane of the general formula (3), (E) 1 to 100 ppm calculated as platinum metal of a platinum series catalyst, (F) 0.1 to 100 parts by weight of an organic titanate, and (G) 0.1 to 5 parts by weight of an organic peroxide.

The organopolysiloxane used as component (A) of the second primer composition is of the following average compositional formula (5):

$$R^{13}_i SiO_{(4-i)/2} \quad (5)$$

wherein $R^{13}$ is a substituted or unsubstituted monovalent hydrocarbon group, at least 0.15 mol % of $R^{13}$ is alkenyl, letter i is a positive number satisfying $1.9 \leq i \leq 2.3$.

In formula (5), $R^{13}$ is a substituted or unsubstituted monovalent hydrocarbon group, preferably those having 1 to 10 carbon atoms, especially 1 to 6 carbon atoms, for example, alkyl groups such as methyl, ethyl, propyl, butyl, pentyl, hexyl, and cyclohexyl; alkenyl groups such as vinyl, allyl, propenyl and butenyl; aryl groups such as phenyl, tolyl, and naphthyl; aralkyl groups such as benzyl and phenylethyl; and substituted ones of these group wherein a hydrogen atom(s) is replaced by a halogen atom or cyano group, such as chloromethyl, bromoethyl, trifluoropropyl, and cyanoethyl. At least 0.15 mol %, preferably 0.2 to 2.0 mol % of $R^{13}$ is alkenyl, typically vinyl. Letter i is a positive number satisfying $1.9 \leq i \leq 2.3$, preferably $1.95 i \leq 2.05$.

The organopolysiloxane of formula (5) becomes a major component of a coating which is formed by applying the primer composition of the invention, and serves to impart flexibility to the coating and to improve the adhesion of the coating to thermoset silicone rubber. Basically, it is a linear diorganopolysiloxane which may partially contain a branched structure. The organopolysiloxane should have a viscosity of at least 5,000 centistokes at 25° C., preferably 10,000 to 100,000 centistokes at 25° C.

The organopolysiloxane as component (B) is of the following average compositional formula (6):

$$R^{14}_j SiO_{(4-j)/2} \quad (6)$$

wherein $R^{14}$ is a substituted or unsubstituted monovalent hydrocarbon group and letter j is a positive number satisfying $0.5 \leq j \leq 1.8$.

In formula (6), the hydrocarbon group represented by $R^{14}$ is selected from the same exemplary groups as described for $R^{13}$. Letter j is a positive number satisfying $0.5 \leq j \leq 1.8$, especially $0.8 \leq j \leq 1.2$. The organopolysiloxane of formula (6) has a resin structure (or three-dimensional network structure) which contains $R^{14}SiO_{3/2}$ and/or $SiO_2$ units in a molecule and optionally $R^{14}SiO_{1/2}$ and/or $R^{14}SiO_{2/2}$ units.

These organopolysiloxane resins can be obtained by hydrolyzing various organochlorosilanes or organoalkoxysilanes corresponding to the above-mentioned siloxane units.

The organopolysiloxane resins may be used alone or in admixture of two or more. The amount of the organopolysiloxane resin blended is 5 to 200 parts by weight, preferably 10 to 100 parts by weight per 100 parts by weight of component (A). A composition containing less than 5 parts of the organopolysiloxane (B) on this basis would form a weak coating, failing to achieve sufficient bond strength. A composition containing more than 200 parts of the organopolysiloxane (B) would form a brittle coating, also failing to achieve sufficient bond strength.

Component (C) is an organoalkoxysilane or siloxane of the following average compositional formula (1):

  (1)

wherein $R^1$ is a substituted or unsubstituted monovalent hydrocarbon group, $R^1$ is a monovalent organic group having a functional group, $R^3$ is an unsubstituted or alkoxy-substituted alkyl group, letters a, b and c are numbers satisfying $0 \leq a \leq 3$, $0 \leq b \leq 3$, $0 < c \leq 4$, and $0 < a+b+c \leq 4$. Since this organoalkoxysilane or siloxane (C) is the same as the organoalkoxysilane or siloxane described as component (I) of the first primer composition, its description is omitted herein.

The amount of the organoalkoxysilane or siloxane (C) blended is 5 to 500 parts by weight, preferably 10 to 200 parts by weight per 100 parts by weight of component (A). A composition containing less than 5 parts of the organoalkoxysilane or siloxane (C) on this basis would form a weak coating, failing to achieve sufficient bond strength. A composition containing more than 500 parts of the organoalkoxysilane or siloxane (C) would form a brittle coating, also failing to achieve sufficient bond strength.

The organohydrogensiloxane as component (D) is an essential component for drastically improving the adhesion of the second primer composition of the invention. It is analogous to the alkoxysilyl-containing organohydrogensiloxane defined as component (II) of the first primer composition, more specifically an essentially linear organohydrogensiloxane of the following general formula (3) having an SiH group at an end of its molecular chain and an alkoxysilyl group, especially an alkoxysilylalkyl group in its molecule, especially at another end of its molecular chain:

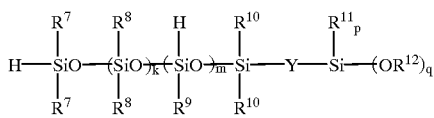  (3)

wherein $R^7$, $R^8$, $R^9$, $R^{10}$, and $R^{11}$ each are a substituted or unsubstituted monovalent hydrocarbon group, Y is a substituted or unsubstituted divalent organic group, $R^{12}$ is an unsubstituted or alkoxy-substituted alkyl group, letters k and m are integers satisfying $0 < k \leq 20$ and $0 \leq m \leq 20$, letter p is equal to 0, 1 or 2, letter q is equal to 1, 2 or 3, and $p+q=3$. The alkoxysilyl-containing organo-hydrogensiloxane of formula (3) is as described in conjunction with the first primer composition.

The organohydrogensiloxanes (D) may be used alone or in admixture of two or more. The amount of the organohydrogensiloxane blended is 1 to 500 parts by weight, preferably 2 to 200 parts by weight per 100 parts by weight of component (A). Less than 1 part of the organohydrogensiloxane (D) on this basis would give a smaller number of active sites capable of interacting with the silicone rubber and would form a weak coating, failing to achieve sufficient bond strength. A composition containing more than 500 parts of the organohydrogensiloxane (D) would form a brittle coating, also failing to achieve sufficient bond strength.

Component (E) is a platinum series catalyst which may be selected from well-known catalysts for addition reaction, for example, metallic platinum, chloroplatinic acid, and complexes of platinum with unsaturated compounds such as ethylene, propylene, butadiene, cyclohexene, dicyclooctane, and 1,1,3,3-tetramethyl-1,3-divinyldisiloxane.

Satisfactory catalysis is achieved by blending the platinum catalyst in an amount of 1 to 100 parts by weight calculated as platinum metal per million parts by weight of component (A), that is, 1 to 100 ppm, preferably 2 to 50 ppm of platinum metal. Less than 1 ppm of the platinum catalyst is ineffective for promoting addition reaction, and a composition would thus form a weak coating, failing to achieve sufficient bond strength. More than 100 ppm of the platinum catalyst promotes addition reaction so much that the active sites capable of interacting with the silicone rubber are lost, failing to achieve sufficient bond strength.

The organic titanate ester used as component (F) of the second primer composition of the invention is essential for enabling the condensation curing of the primer composition, ensuring air drying and improving the adhesion between the coating and a substrate. It is as exemplified for component (III) of the first primer composition.

The amount of the organic titanate is 0.1 to 100 parts, preferably 0.3 to 30 parts by weight per 100 parts by weight of component (A). Less than 0.1 part of the organic titanate on this basis would little promote air drying and form a weak coating, failing to achieve sufficient bond strength. A composition containing more than 100 parts of the organic titanate would form a brittle coating, also failing to achieve sufficient bond strength.

Component (G) is an organic peroxide which is well known in the art as a vulcanizing agent for thermosetting silicone rubber compositions. The organic peroxide is effective for effecting the radical curing of a primer composition and improving the adhesion between a coating and a substrate. Examples of the organic peroxide include dicumyl peroxide, tert-butyl perbenzoate, and 2,5-dimethyl-2,5-di(tert-butylperoxy)hexane. The amount of the organic peroxide blended is 0.1 to 5 parts, preferably 0.2 to 2 parts by weight per 100 parts by weight of component (A).

The second primer composition can be obtained by uniformly mixing predetermined amounts of components (A) to (G). If desired, a suitable solvent is added to the composition for dilution. Such solvents are selected from hexane, heptane, toluene, xylene, acetone, methyl ethyl ketone, ethyl acetate, ethanol, isopropanol, methylene chloride, and trichloroethylene and mixtures thereof. Other optional additives are added to the primer composition of the invention. Inorganic fillers such as fumed silica, red iron oxide, cerium oxide, and titanium oxide are useful for improving the strength and heat resistance of the resulting coating. These optional additives are added in suitable amounts insofar as the objects of the invention are not impaired.

On use, the first or second primer composition is applied to a surface of a substrate before silicone rubber is joined to the primer coated surface. When the primer composition is diluted with a solvent on use, a coating thereof may be dried in air for about 10 to 60 minutes before silicone rubber is joined thereto. Where the primer layer can flow upon application of silicone rubber, the primer layer may be adjusted in strength as by heating at about 100 to 200° C. for about 5 to 60 minutes for baking.

The primer compositions of the invention are useful in assisting in joining thermoset silicone rubber, especially low hardness thermoset silicone rubber having a JIS A hardness of less than 20 to various substrates. The primer compositions are applicable to substrates of metals such as iron, aluminum, stainless steel, nickel, zinc and tin-plated steel strips and various plastics.

The primer compositions of the invention have a sufficient bonding power to join thermoset silicone rubber, especially low hardness thermoset silicone rubber having a JIS A hardness of less than 20 to various substrates of metals such as iron, aluminum, stainless steel, nickel, zinc and tin-plated steel strips and various plastics. The inventive compositions are advantageously used as a primer for assisting in bonding thermoset silicone rubber to metal members used as roll parts in copying machines and parts associated with engines and various other substrates

EXAMPLE

Examples of the invention are given below by way of illustration and not by way of limitation. All parts are by weight and the viscosity is a measurement at 25° C.

An adhesion test was made on primer compositions of Examples by the following procedure.

Adhesion Test

Iron plates of 50 mm long×25 mm wide×1 mm thick as substrates were set in a mold such that they overlapped at one end. A primer composition was applied to the overlapping portions of the iron plates. Using an injection molding machine, a silicone rubber composition was injected between the overlapping portions to a configuration of 10 mm long, 25 mm wide and 2 mm thick, heat cured at 120° C. for 3 minutes, and post cured at 200° C. for 4 hours. In this way, a test sample comprising substrates 1 and 1 joined via a silicone rubber layer 2 as shown in FIG. 1 was prepared.

A tensile shear bond strength was measured by pulling the substrates in opposite directions at a speed of 50 mm/min. The failure of the bonded portion was observed and rated according to the following criterion.

O: satisfactory bond, 100% cohesive failure
Δ: partial peeling
X: 100% peeling or primer failure Example 1 and Comparative Example 1

A primer composition 1 (Example 1) was prepared by mixing 100 parts of tetraethoxysilane, 50 parts of methylhydrogensiloxane having a trimethoxysilyl group of the following formula (a) having a viscosity of 15 centistokes -(to be referred to as polysiloxane (a), hereinafter), and 50 parts of tetrabutyl titanate, adding 1,000 parts of heptane thereto, and thoroughly mixing the components.

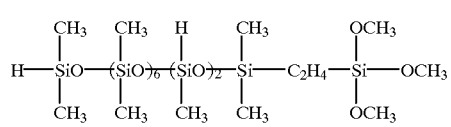

(a)

For comparison purposes, a primer composition 2 (Comparative Example 1) was prepared as in Example 1 except that polysiloxane (a) was omitted.

According to the adhesion test described above, these primer compositions 1 and 2 were applied to the overlapping portions of the iron plates and dried in air for 30 minutes. Using an addition reaction type liquid silicone rubber composition KE138OA/B (Shin-Etsu Chemical Industry Co., Ltd., JIS A hardness 5 after cured) as the silicone rubber composition, an adhesive test sample was prepared. The test result was 100% cohesive failure for primer composition 1 and peeling for primer composition 2. JIS A hardness is a hardness measured by JIS A hardness tester according to JIS K 6301.

Example 2 and Comparative Examples 2–4

A primer composition 3 (Example 2) was prepared by mixing 100 parts of tetraethoxysilane, 50 parts of vinyltriethoxysilane, 50 parts of methylhydrogensiloxane having a trimethoxysilyl group of the following formula (b) having a viscosity of 15 centistokes (to be referred to as polysiloxane (b), hereinafter), and 50 parts of tetrabutyl titanate, adding 1,000 parts of heptane thereto, and thoroughly mixing the components.

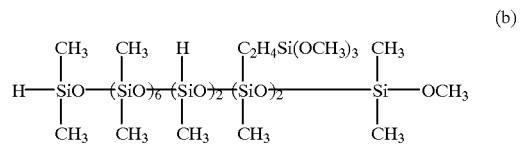

(b)

For comparison purposes, a primer composition 4 (Comparative Example 2) was prepared as in Example 2 except that 50 parts of methylhydrogensiloxane of the following formula (c) having a viscosity of 10 centistokes (to be referred to as polysiloxane (c), hereinafter) was used instead of polysiloxane (b).

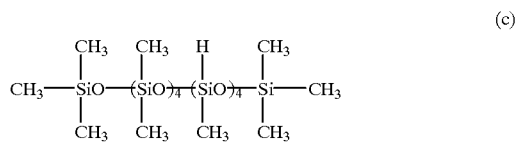

(c)

For comparison purposes, a primer composition 5 (Comparative Example 3) was prepared as in Example 2 except that 50 parts of methylhydrogensiloxane having a trimethoxysilyl group of the following formula (d) having a viscosity of 15 centistokes (to be referred to as polysiloxane (d), hereinafter) was used instead of polysiloxane (b).

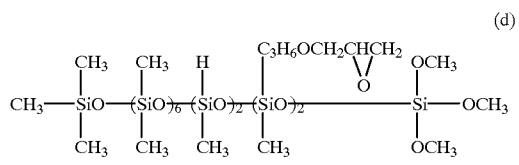

(d)

For comparison purposes, a primer composition 6 (Comparative Example 4) was prepared as in Example 2 except that polysiloxane (b) was omitted.

As in Example 1, these primer compositions 3 to 6 were examined by the adhesion test. The test result was 100% cohesive failure for primer composition 3 and partial or entire peeling for primer compositions 4 to 6.

The composition of the primer compositions is shown in Table 1 together with the results of the adhesion test.

TABLE 1

| Primer composition No. | E1 1 | CE1 2 | E2 3 | CE2 4 | CE3 5 | CE4 6 |
|---|---|---|---|---|---|---|
| Composition (pbw) | | | | | | |
| Tetraethoxysilane | 100 | 100 | 100 | 100 | 100 | 100 |
| Vinyltriethoxysilane | — | — | 50 | 50 | 50 | 50 |
| Polysiloxane (a) | 50 | — | — | — | — | — |
| Polysiloxane (b) | — | — | 50 | — | — | — |
| Polysiloxane (c) | — | — | — | 50 | — | — |
| Polysiloxane (d) | — | — | — | — | 50 | — |
| Tetrabutyl titanate | 50 | 50 | 50 | 50 | 50 | 50 |
| Heptane | 1000 | 1000 | 1000 | 1000 | 1000 | 1000 |
| Adhesion test | ○ | x | ○ | x | Δ | x |

Primer compositions within the scope of the invention all exhibit good adhesion.

Example 3 and Comparative Example 5

A primer composition 7 (Example 3) was prepared by mixing 100 parts of methylvinylpolysiloxane raw rubber consisting of 97 mol % of dimethylsiloxane units and 3 mol % of methylvinylsiloxane units and having an average degree of polymerization of 5,000, 50 parts of methylphenylpolysiloxane resin consisting of 40 mol % of methylsiloxane units, 30 mol % of dimethylsiloxane units, and 30 mol % of phenylsiloxane units and having a silanol content of 0.15 mol %, 15 parts of tetraethoxysilane, 10 parts of methylhydrogensiloxane having a trimethoxysilyl group of the following formula (a) having a viscosity of 15 centistokes (to be referred to as polysiloxane (a), hereinafter), 1 part of an isopropanol solution of chloroplatinic acid (platinum concentration 10 ppm), 5 parts of tetrabutyl titanate, and 1 part of dicumyl peroxide, adding 500 parts of toluene and 1,000 parts of heptane thereto, and thoroughly mixing the components.

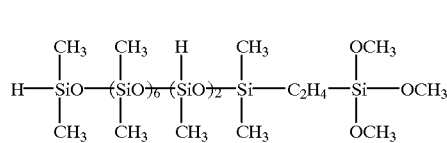
(a)

For comparison purposes, a primer composition 8 (Comparative Example 5) was prepared as in Example 3 except that 10 parts of methylhydrogensiloxane of the following formula (e) having a viscosity of 10 centistokes (to be referred to as polysiloxane (e), hereinafter) was used instead of polysiloxane (a).

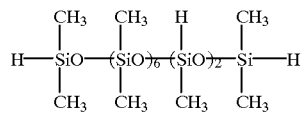
(e)

According to the adhesion test described above, these primer compositions 7 and 8 were applied to the overlapping portions of the iron plates, dried in air for 30 minutes, and baked at 150° C. for 30 minutes. Using an addition reaction type liquid silicone rubber composition KE138OA/B (Shin-Etsu Chemical Industry Co., Ltd., JIS A hardness 5 after cured) as the silicone rubber composition, an adhesive test sample was prepared. The test result was 100% cohesive failure for primer composition 7 and peeling for primer composition 8.

Example 4 and Comparative Example 6–8

A primer composition 9 (Example 4) was prepared by mixing 100 parts of the methylvinylpolysiloxane raw rubber used in Example 3, 50 parts of methylphenylpolysiloxane resin, 10 parts of tetraethoxysilane, 5 parts of vinyltriethoxysilane, 20 parts of methylhydrogensiloxane having a trimethoxysilyl group of the following formula (f) having a viscosity of 12 centistokes (to be referred to as polysiloxane (f), hereinafter), 1 part of an isopropanol solution of chloroplatinic acid (platinum concentration 10 ppm), 5 parts of tetrabutyl titanate, and 1 part of dicumyl peroxide, adding 500 parts of toluene and 1,000 parts of heptane thereto, and thoroughly mixing the components.

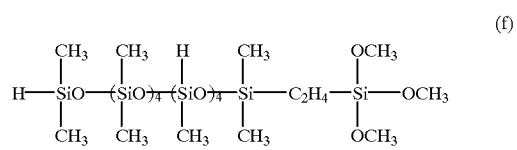
(f)

For comparison purposes, a primer composition 10 (Comparative Example 6) was prepared as in Example 4 except that 15 parts of methylhydrogensiloxane of the following formula (g) having a viscosity of 10 centistokes (to be referred to as polysiloxane (g), hereinafter) was used instead of polysiloxane (f).

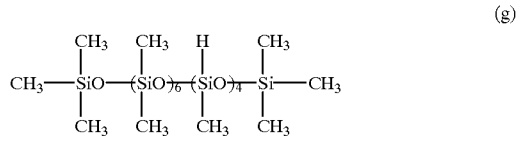
(g)

For comparison purposes, a primer composition 11 (Comparative Example 7) was prepared as in Example 4 except that 20 parts of methylhydrogensiloxane having a trimethoxysilyl group of the following formula (h) having a viscosity of 15 centistokes (to be referred to as polysiloxane (h), hereinafter) was used instead of polysiloxane (f).

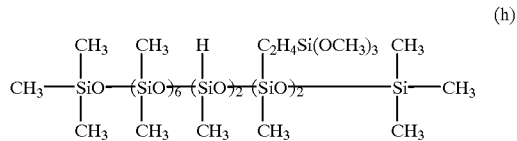
(h)

For comparison purposes, a primer composition 12 (Comparative Example 8) was prepared as in Example 4 except that polysiloxane (f) was omitted.

As in Example 3, these primer compositions 9 to 12 were examined by the adhesion test. The test result was 100% cohesive failure for primer composition 9 and partial or entire peeling for primer compositions 10 to 12.

The composition of the primer compositions is shown in Table 2 together with the results of the adhesion test.

TABLE 2

| Primer composition No. | E3 7 | CE5 8 | E4 9 | CE6 10 | CE7 11 | CE8 12 |
|---|---|---|---|---|---|---|
| Composition (pbw) | | | | | | |
| Methylvinylpolysiloxane raw rubber | 100 | 100 | 100 | 100 | 100 | 100 |
| Methylphenylpolysiloxane resin | 50 | 50 | 50 | 50 | 50 | 50 |
| Tetraethoxysilane | 15 | 15 | 10 | 10 | 10 | 10 |
| Vinyltriethoxysilane | — | — | 5 | 5 | 5 | 5 |
| Polysiloxane (a) | 10 | — | — | — | — | — |
| Polysiloxane (e) | — | 10 | — | — | — | — |
| Polysiloxane (f) | — | — | 20 | — | — | — |
| Polysiloxane (g) | — | — | — | 15 | — | — |
| Polysiloxane (h) | — | — | — | — | 20 | — |
| Chloroplatinic acid in isopropanol | 1 | 1 | 1 | 1 | 1 | 1 |
| Tetrabutyl titanate | 5 | 5 | 5 | 5 | 5 | 5 |
| Dicumyl peroxide | 1 | 1 | 1 | 1 | 1 | 1 |
| Toluene | 500 | 500 | 500 | 500 | 500 | 500 |
| Heptane | 1000 | 1000 | 1000 | 1000 | 1000 | 1000 |
| Adhesion test | ○ | x | ○ | x | Δ | x |

Primer compositions within the scope of the invention all exhibit good adhesion.

While the invention has been described in what is presently considered to be a preferred embodiment, other variations and modifications will become apparent to those skilled in the art. It is intended, therefore, that the invention not be limited to the illustrative embodiments, but be interpreted within the full spirit and scope of the appended claims.

What is claimed is:

1. A primer composition comprising (I) 100 parts by weight of an organoalkoxysilane or siloxane of the following average compositional formula (1):

$$R^1{}_a R^2{}_b (OR^3)_c SiO_{(4-a-b-c)/2} \tag{1}$$

wherein $R^1$ is a substituted or unsubstituted monovalent hydrocarbon group, $R^2$ is a monovalent organic group having a functional group, $R^3$ is an unsubstituted or alkoxy-substituted alkyl group, letters a, b and c are numbers satisfying $0 \leq a \leq 3$, $0 \leq b \leq 3$, $0 < c \leq 4$, and $0 < a+b+c \leq 4$, (II) 1 to 500 parts by weight of an alkoxysilyl-containing organohydrogensiloxane of the following average compositional formula (2):

$$H_d R^4{}_e (XSiR^5{}_g(OR^6)_h)_f SiO_{(4-d-e-f)/2} \tag{2}$$

wherein $R^4$ and $R^1$ each are a substituted or unsubstituted monovalent hydrocarbon group, $R^6$ is an unsubstituted or alkoxy-substituted alkyl group, X is a substituted or unsubstituted divalent organic group or oxygen atom, letters d, e and f are numbers satisfying $0 < d \leq 2$, $0 \leq e \leq 3$, $0 < f \leq 3$, and $0 < d+e+f \leq 4$, letter g is equal to 0, 1 or 2, letter h is equal to 1, 2 or 3, and g+h=3, and (III) 0.1 to 500 parts by weight of an organic titanate.

2. The primer composition of claim 1 wherein the alkoxysilyl-containing organohydrogensiloxane (II) is of the following general formula (3) or (4):

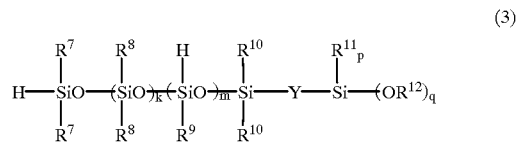

(3)

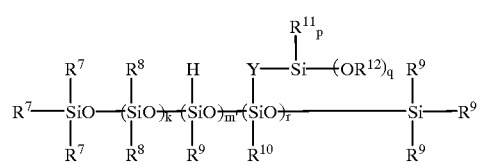

(4)

wherein $R^7$, $R^8$, $R^9$, $R^{10}$, and $R^{11}$ each are a substituted or unsubstituted monovalent hydrocarbon group, Y is a substituted or unsubstituted divalent organic group, $R^{12}$ is an unsubstituted or alkoxy-substituted alkyl group, letters k, m, m', and r are integers satisfying $0 < k \leq 20$, $0 \leq m \leq 20$, $1 \leq m' \leq 20$, and $1 \leq r \leq 20$, letter p is equal to 0, 1 or 2, letter q is equal to 1, 2 or 3, and p+q=3.

3. A primer composition comprising (A) 100 parts by weight of an alkenyl-containing organopolysiloxane of the following average compositional formula (5) having a viscosity of at least 5,000 centistokes at 25° C.:

$$R^{13}{}_i SiO_{(4-i)/2} \tag{5}$$

wherein $R^{13}$ is a substituted or unsubstituted monovalent hydrocarbon group, at least 0.15 mol % of $R^{13}$ is alkenyl, letter i is a positive number satisfying $1.9 \leq i \leq 2.3$, (B) 5 to 200 parts by weight of an organopolysiloxane of the following average compositional formula (6):

$$R^{14}{}_j SiO_{(4-j)/2} \tag{6}$$

wherein $R^{14}$ is a substituted or unsubstituted monovalent hydrocarbon group and letter j is a positive number satisfying $0.5 \leq j \leq 1.8$, (C) 5 to 500 parts by weight of an organoalkoxysilane or siloxane of the following average compositional formula (1):

$$R^1{}_a R^2{}_b (OR^3)_c SiO_{(4-a-b-c)/2} \tag{1}$$

wherein $R^1$ is a substituted or unsubstituted monovalent hydrocarbon group, $R^2$ is a monovalent organic group having a functional group, $R^3$ is an unsubstituted or alkoxy-substituted alkyl group, letters a, b and c are numbers satisfying $0 \leq a \leq 3$, $0 \leq b \leq 3$, $0 < c \leq 4$, and $0 < a+b+c \leq 4$, (D) 1 to 500 parts by weight of an organohydrogensiloxane of the following general formula (3) having an SiH group at a molecular chain end and an alkoxysilyl group in a molecule:

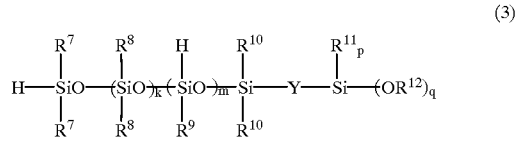

(3)

wherein $R^7$, $R^8$, $R^9$, $R^{10}$, and $R^{11}$ each are a substituted or unsubstituted monovalent hydrocarbon group, Y is a substituted or unsubstituted divalent organic group, $R^{12}$ is an unsubstituted or alkoxy-substituted alkyl group, letters k and m are integers satisfying 0<k≦20 and 0≦m≦20, letter E is equal to 0, 1 or 2, letter q is equal to 1, 2 or 3, and p+q=3, (E) 1 to 100 ppm calculated as platinum metal of a platinum series catalyst, (F) 0.1 to 100 parts by weight of an organic titanate, and (G) 0.1 to 5 parts by weight of an organic peroxide.

4. A composition according to claim 1, wherein $R^1$ is a $C_{1-10}$-monovalent hydrocarbon group.

5. A composition according to claim 1, wherein $R^1$ is methyl, ethyl, propyl, butyl, pentyl, hexyl, cyclohexyl, phenyl, tolyl, naphthyl, benzyl or phenylethyl, each optionally substituted by halogen or cyano.

6. A composition according to claim 1, wherein $R^2$ is $R'—(Z)_x—$, where $R^1$ is a functional group and Z is an alkylene group of 1 to 10 carbon atoms optionally containing an ether linkage, and x is 0 or 1.

7. A composition according to claim 6, wherein the functional group is a vinyl, allyl, propenyl, butenyl, acryl, methacryl, epoxy, amino, aminoalkyl-substituted amino, mercapto or (x-alkoxycarbony group.

8. A composition according to claim 1, wherein $R^3$ is an optionally alkoxy- substituted $C_{1-4}$-alkyl group.

9. A composition according to claim 8, wherein $R^3$ is methyl, ethyl, propyl, butyl, methoxyemthyl, methoxyethyl, ethoxymethyl or ethoxyethyl.

10. A composition according to claim 1, wherein 0≦a≦1, 0≦b ≦1, 2≦c≦4 and 2≦a+b+c≦4.

11. A composition according to claim 1, wherein the organoalkoxysilane (1) is vinyltrimethoxysilane, vinyltriethoxysilane, vinyltris (β-methoxyethyoxy)silane, methylvinyldiethoxysilane, allyltrimethoxysilane, γ-acryloyloxymethyltrimethoxysilane, γ-methacryloyloxypropyltrimethoxysilane, γ-glycidyloxypropyltrimethoxysilane, γ-aminopropyltrimethoxysilane, γ-aminopropyltriethoxysilane, N-(β-aminoethyl)-γ-aminopropyltrimethoxysilane, γ-mercaptopropyltrimethoxysilane, α-(ethoxycarbonyl)-ethyltrimethoxysilane, tetramethoxysilane or tetraethoxysilane.

12. A composition according to claim 1, wherein $R^4$ and $R^5$ are each independently a $C_{1-10}$-monovalent hydrocarbon group.

13. A composition according to claims 1, wherein $R^4$ and RW are each independently methyl, ethyl, propyl, butyl, pentyl, hexyl, cyclohexyl, phenyl, tolyl, naphthyl, benzyl or phenylethyl, each optionally substituted by halogen or cyano.

14. A composition according to claim 1, wherein $R^6$ is an optionally aLkoxy- substituted $C_{1-4}$-alkyl group.

15. A composition according to claim 1, wherein X is a $C_{1-10}$-divalent organic group or oxygen.

16. A composition according to claim 15, wherein X is a methylene, ethylene, propylene, butylene or phenylene group, optionally substituted by halogen or cyano.

17. A composition according to claim 1, wherein 0≦d≦1, 1≦e≦2, 0≦f≦1,2≦d+e+f≦3,g is 0 or 1 and h is2or3.

18. A composition according to claim 2, wherein 0<m≦20.

19. A composition according to claim 3, wherein 0<m≦20.

20. A composition according to claim 1, wherein $R^1$ is methyl, ethyl, propyl, butyl, pentyl, hexyl, cyclohexyl, phenyl, tolyl, naphthyl, benzyl or phenylethyl, each optionally substituted by halogen or cyano;

$R^2$ is R'—(Z),—, where $R^1$ is a functional group which is a vinyl, allyl, propenyl, butenyl, acryl, methacryl, epoxy, amino, aminoalkyl-substituted amino, mercapto or α-alkoxycarbony group; and Z is an alkylene group of 1 to 10 carbon atoms optionally containing an ether linkage, and x is 0 or 1;

$R^3$ is methyl, ethyl, propyl, butyl, methoxyemthyl, methoxyethyl, ethoxymethyl or ethoxyethyl;

$R^4$ and Rs are each independently methyl, ethyl, propyl, butyl, pentyl, hexyl, cyclohexyl, phenyl, tolyl, naphthyl, benzyl or phenylethyl, each optionally substituted by halogen or cyano;

$R^6$ is an optionally alkoxy-substituted $C_{1-4}$-alkyl group; and

X is a methylene, ethylene, propylene, butylene or phenylene group, optionally substituted by halogen or cyano.

* * * * *